(12) United States Patent
Fuzell-Casey (10) Patent No.: US 9,639,871 B2
(45) Date of Patent: May 2, 2017

(54) METHODS AND APPARATUSES FOR ASSIGNING MOODS TO CONTENT AND SEARCHING FOR MOODS TO SELECT CONTENT

(71) Applicant: Aperture Investments LLC, Mercer Island, WA (US)

(72) Inventor: Jacquelyn Fuzell-Casey, Mercer Island, WA (US)

(73) Assignee: APPERTURE INVESTMENTS, LLC, Mercer Island, WA (US)

( * ) Notice: Subject to any disclaimer, the term of this patent is extended or adjusted under 35 U.S.C. 154(b) by 194 days.

(21) Appl. No.: 13/828,656

(22) Filed: Mar. 14, 2013

(65) Prior Publication Data

US 2014/0282237 A1 Sep. 18, 2014

(51) Int. Cl.
*G06F 3/0482* (2013.01)
*G06Q 30/06* (2012.01)

(52) U.S. Cl.
CPC ................ *G06Q 30/0601* (2013.01)

(58) Field of Classification Search
CPC .... G06F 3/0481; G06F 3/0482; G06F 3/0484; G06F 17/30784; G06F 17/30823; G06F 17/30828; G06F 17/30864; G06F 17/30867
USPC ............... 707/706–710; 715/810–812, 832
See application file for complete search history.

(56) References Cited

U.S. PATENT DOCUMENTS

| | | |
|---|---|---|
| 5,561,649 A | 10/1996 | Lee |
| 6,748,395 B1 | 6/2004 | Picker |
| 6,993,532 B1 | 1/2006 | Platt |
| 7,022,907 B2 | 4/2006 | Lu |
| 7,024,424 B1 | 4/2006 | Platt |
| 7,080,324 B1 * | 7/2006 | Nelson ................ G06F 3/04847 715/771 |
| 7,205,471 B2 | 4/2007 | Looney |
| 7,206,775 B2 | 4/2007 | Kaiser |
| 7,227,074 B2 | 6/2007 | Ball |
| 7,296,031 B1 | 11/2007 | Platt |
| 7,396,990 B2 | 7/2008 | Lu |
| 7,427,708 B2 | 9/2008 | Ohmura |
| 7,485,796 B2 | 2/2009 | Myeong |
| 7,541,535 B2 | 6/2009 | Ball |
| 7,562,032 B2 | 7/2009 | Abbosh |
| 7,582,823 B2 | 9/2009 | Kim |
| 7,626,111 B2 | 12/2009 | Kim |

(Continued)

*Primary Examiner* — Kevin L Young
*Assistant Examiner* — Seth A Silverman
(74) *Attorney, Agent, or Firm* — Baker & Hostetler LLP (57) ABSTRACT

Systems and methods for content identification and search are described. Content is identified or represented by one or more moods conveyed by the content to viewers. Identified moods are assigned range areas corresponding to each mood. Range areas are assigned spans corresponding to the range areas. Assigned spans are digitized and stored for searching. Searches are initiated by users through the identification of one or more moods and corresponding identification spans within ranges corresponding to the ranges. Once a user has selected at least one search span, a search is performed by looking for content having identification spans that at least partially correspond to the selected search spans, with content being ordered or ranked based on the degree of overlap between the identification spans and the search spans.

31 Claims, 7 Drawing Sheets

(56) References Cited

U.S. PATENT DOCUMENTS

| | | | |
|---|---|---|---|
| 7,765,491 B1* | 7/2010 | Cotterill | G06F 3/04847 |
| | | | 345/156 |
| 7,786,369 B2 | 8/2010 | Eom | |
| 7,809,793 B2 | 10/2010 | Kimura | |
| 7,822,497 B2 | 10/2010 | Wang | |
| 7,858,868 B2 | 12/2010 | Kemp | |
| 8,013,230 B2 | 9/2011 | Eggink | |
| 8,229,935 B2 | 7/2012 | Lee | |
| 8,248,436 B2 | 8/2012 | Kemp | |
| 8,260,778 B2 | 9/2012 | Ghatak | |
| 8,269,093 B2 | 9/2012 | Naik | |
| 8,346,801 B2 | 1/2013 | Hagg | |
| 8,354,579 B2 | 1/2013 | Park | |
| 8,407,224 B2 | 3/2013 | Bach | |
| 8,410,347 B2 | 4/2013 | Kim | |
| 8,505,056 B2 | 8/2013 | Cannistraro | |
| 8,686,270 B2 | 4/2014 | Eggink | |
| 8,688,699 B2 | 4/2014 | Eggink | |
| 2008/0184167 A1* | 7/2008 | Berrill | G06F 3/04847 |
| | | | 715/833 |
| 2009/0069914 A1 | 3/2009 | Kemp | |
| 2009/0071316 A1 | 3/2009 | Oppenheimer | |
| 2009/0182736 A1 | 7/2009 | Ghatak | |
| 2009/0234888 A1 | 9/2009 | Holmes | |
| 2010/0011388 A1 | 1/2010 | Bull | |
| 2010/0042932 A1 | 2/2010 | Lehtiniemi | |
| 2010/0053168 A1 | 3/2010 | Kemp | |
| 2010/0091138 A1 | 4/2010 | Nair | |
| 2010/0094441 A1 | 4/2010 | Mochizuki | |
| 2010/0223128 A1 | 9/2010 | Dukellis | |
| 2010/0253764 A1 | 10/2010 | Sim | |
| 2010/0325135 A1* | 12/2010 | Chen | G06F 17/30053 |
| | | | 707/759 |
| 2011/0112671 A1 | 5/2011 | Weinstein | |
| 2011/0184539 A1 | 7/2011 | Agevik | |
| 2011/0202567 A1 | 8/2011 | Bach | |
| 2011/0239137 A1* | 9/2011 | Bill | G06F 17/30749 |
| | | | 715/757 |
| 2011/0242128 A1* | 10/2011 | Kang | G06T 11/001 |
| | | | 345/594 |
| 2011/0252947 A1 | 10/2011 | Eggink | |
| 2011/0289075 A1 | 11/2011 | Nelson | |
| 2011/0314039 A1 | 12/2011 | Zheleva | |
| 2012/0172059 A1 | 7/2012 | Kim | |
| 2012/0179693 A1 | 7/2012 | Knight | |
| 2012/0179757 A1 | 7/2012 | Jones | |
| 2012/0197897 A1 | 8/2012 | Knight | |
| 2012/0226706 A1 | 9/2012 | Choi | |
| 2012/0296908 A1 | 11/2012 | Bach | |
| 2013/0086519 A1* | 4/2013 | Fino | G06Q 30/02 |
| | | | 715/810 |
| 2013/0138684 A1* | 5/2013 | Kim | G06F 17/30743 |
| | | | 707/769 |
| 2013/0173526 A1* | 7/2013 | Wong | G06N 5/02 |
| | | | 706/54 |
| 2013/0204878 A1 | 8/2013 | Kim | |
| 2013/0205223 A1 | 8/2013 | Gilbert | |
| 2013/0247078 A1* | 9/2013 | Nikankin | H04N 21/44204 |
| | | | 725/13 |
| 2014/0052731 A1 | 2/2014 | Dahule | |
| 2014/0085181 A1* | 3/2014 | Roseway | G06F 1/1652 |
| | | | 345/156 |

* cited by examiner

METHODS AND APPARATUSES FOR ASSIGNING MOODS TO CONTENT AND SEARCHING FOR MOODS TO SELECT CONTENT

TECHNICAL FIELD

This application relates to the field of content searching and selection and more particularly to systems and methods for assigning ranges to content, such as video content, that cannot be adequately identified or represented by key words, numbers, images, tags or other traditional identifiers alone, and searching for such content based on the assigned ranges.

BACKGROUND

Traditional search engines, such as Web search engines, typically work by storing information about web pages retrieved by web crawlers or spiders and analyzing the content of those pages to determine how each page should be indexed. For example, words can be extracted from the titles, content, headings, or meta tags of the pages. Data about the web pages are then stored in an index database for use in later queries. A query can be a single word.

When a user enters a query into a search engine (typically by using keywords), the engine examines its index and provides a listing of best-matching web pages according to its criteria, usually with a short summary containing the document's title and sometimes parts of the text or an image. The index is built from the information stored with the data and the method by which the information is indexed. Some search engines allow users to search by date or to search before, after or during certain periods of time, based on dates found in the web pages or when the web pages were indexed.

Most search engines support the use of Boolean operators to further specify the search query. Boolean operators are for literal searches that allow the user to refine and extend the terms of the search. The engine looks for the words or phrases exactly as entered. Some search engines support proximity search, which allows users to define the distance between keywords, and concept-based searching, which involves the use of statistical analysis on web pages containing searched for words or phrases. Natural language queries allow the user to type a question in the same form a user might ask the question to a human. The search engine then parses the question to identify key words and may construct its own Boolean query based on the key words and their association with one another.

Since the usefulness of a search engine depends on the relevance of the results it generates, most search engines employ various methods for determining which web pages that match the search terms are more relevant, popular, or authoritative than others, with the former being ranked before the latter. How a search engine decides which pages are the best matches, and what order the results should be shown in, varies widely from one engine to another, but two main systems have emerged. One employs predefined and hierarchically ordered keywords that humans have programmed extensively while the other generates an inverted index by analyzing texts it locates.

A text-based search engine cannot, however, search for text that is not there, so a text-based search engine would not be able to index and search photos and videos unless the photos or videos were also associated with words. A number of color-based search engines have been developed to help improve image searching. For example, Picitup's PicColor product (www.picitup.com) is a visual search engine that allows images to be searched for specific colors selected from a color palette, Picitup's Mutlicolor Flickr search allows users to search for the combination of a single color and a limited number of shapes, but not words. For example, a user could select the color "orange" and a "star" shape and possibly get an image of an orangish, star-shaped starfish as a result, Shapes are identified through image recognition software. Multicolor by Idee Inc. (http://labs.tineye.com is another visual search engine that allows a user to select multiple colors from a palette, such as both orange and yellow, but does not combine these color searches with text searching. Etsy, an online shop for handmade products, has a color search option that is combined with words in a limited manner. For example, a user could first select a color of interest, then enter a key word and be returned numerous items that match the key word and include the selected color.

Other content search methods, such as search engines used to select movies, music, books, etc., on various websites include preloaded information about the content, such as action, thriller, non-fiction, jazz, etc. If a user enters the word "action" on a movie website, then the user would get a listing of movies considered to be "action" movies. Such content is usually categorized within a narrow range of choices and users can only search for content that falls within those specific categories. For example, if a user wants to search for something like action, which is not exactly action, the user will have to pick one of the other category tags, such as comedy, thriller, etc.; there is no option for picking a range around the idea of action because words are too precise for an unspecific search. Likewise, some content, such as movies, may be rated according to whether people liked the movie, with a well-liked movie getting five stars, or some similar rating, and unliked movies getting one star or no stars. Users can then search for movies that have more than a certain number of stars, such as no movies with less than three stars. In such cases, the stars have nothing to do with the content of the movie itself, but rather only people's opinion of that movie.

SUMMARY

A system and method for content search and selection is described. Embodiments enable users to search for and be presented with content for selection within a database or network, such as video content, that cannot be adequately identified or represented (and subsequently searched for) using key words, numbers, images, tags or other traditional identifiers alone. Content is identified or represented by one or more moods conveyed by the content to viewers. Once moods are assigned to content, range areas corresponding to each mood are also selected and identification spans or ranges corresponding to the range areas are assigned for each mood for each of the content. Searches are initiated by users through the identification of one or more moods, based on words, which are each then represented by a ranges similar to those used by viewers to assign moods. Once a user has selected at least one search range area or search range, a search is performed by looking for content having identification spans or ranges that at least partially correspond to the selected search span/range, with content being ordered or ranked based on the degree of overlap between the identification spans and the search spans.

BRIEF DESCRIPTION OF THE DRAWINGS

Throughout the drawings, reference numbers are re-used to indicate correspondence between referenced elements.

The drawings are provided to illustrate embodiments of the inventive subject matter described herein and not to limit the scope thereof.

DETAILED DESCRIPTION OF ILLUSTRATIVE EMBODIMENTS

In the English language, the word "emotion" is used as a generic term for subjective, conscious experience that is characterized primarily by psychophysiological expressions, biological reactions, and mental states. A "mood" is considered to be an emotional state. Moods differ from emotions in that they are less specific, less intense, and less likely to be triggered by a particular stimulus or event. Moods generally have either a positive or negative valence. In other words, people typically speak of being in a good mood or a bad mood. "Feelings" are also considered to be the subjective, conscious experience of emotion. Collectively the words "emotion", "feeling" and "mood" are used to describe the subjective, conscience perception of individuals to a variety of different factors, such as internal factors (i.e., mental, chemical, physical, etc.) and external factors that are internalized (i.e., touch, sight, taste, hearing, etc.).

When a human perceives content, such as text, pictures, odors, sound, video, etc., that content often triggers an emotion, feeling, mood or other subjective, conscious experience. To simplify the description provided herein, such experiences or triggers will be referred to herein as moods, but the description provided herein should not be limited to just the commonly understood meaning of the word "mood" and should be understood to also include emotions, feelings and similar expressions of subjective, conscious experiences. As people often confuse moods with emotions, the description of moods used herein also includes emotions, feelings and related concepts.

Also, the present disclosure is directed to embodiments of identifying and searching content representing moods in the context of video content, but the present disclosure is not limited to video content and includes any type of content that trigger moods in humans. Any form of content can trigger different impressions of moods within humans and the particular mood that a person may feel upon being subjected to certain content can vary from person to person, depending on their internal factors, gender and other circumstances. The same content that may create a jovial mood in one person may create a lonely mood in another due to their particular circumstances. However, when a sufficiently large number of people perceive an item of content, one or more average moods may result, but that average is not specific and may be represented by a fairly large range.

As described in the Background, search engines that rely upon words, tags, colors, shapes and other forms of identifiers are incapable of dealing with the level of ambiguity that exists in the context of moods. The word "mood" is only the word "mood" and while a search engine may also search for synonyms to the word "mood", the synonyms are just different words representing the searched for word. For example, a mood could be identified as "green" and have a number of green colored objects associated with it when a search was performed for that mood, but in this case, the search is still being run on the basis of the word and not the mood itself. Likewise a tag is just a tag and the color "orange" or the shape "star" cannot be anything different than "orange" and "star-like", respectfully. If content were to be identified with just a word that corresponds to a commonly understood mood that might correspond to that content, such as "jovial", i.e., the content makes a perceiver feel jovial, the content would be unnecessarily limited to just that identifier. As described above, the same content may generate a range of moods that include jovial, in various degrees, but which is not limited to just the expression of that single word.

To further illustrate the wide range of moods that are known to exist, as represented by the English language, the following is one possible example list: Accepted, Accomplished, Aggravated, Alone, Amused, Angry, Annoyed, Anxious, Apathetic, Ashamed, Awake, Bewildered, Bitchy, Bittersweet, Blah, Blank, Blissful, Bored, Bouncy, Calm, Cheerful, Chipper, Cold, Complacent, Confused, Content, Cranky, Crappy, Crazy, Crushed, Curious, Cynical, Dark, Depressed, Determined, Devious, Dirty, Disappointed, Discontent, Ditzy, Dorky, Drained, Ecstatic, Energetic, Enraged, Enthralled, Envious, Exanimate, Excited, Flirty, Frustrated, Full, Giddy, Gloomy, Good, Grateful, Grumpy, Guilty, Happy, Hopeful, Impressed, indescribable, Indifferent, Infuriated, Irate, irritated, Jealous, Jovial, Jubilant, Lazy, Lethargic, Listless, Lonely, Loved, Mad, Melancholy, Mellow, Mischievous, Moody, Morose, Naughty, Nerdy, Not Specified, Numb, Okay, Optimistic, Peaceful, Pessimistic, Pissed off, Pleased, Predatory, Quixotic, Recumbent, Rejected, Rejuvenated, Relaxed, Relieved, Restless, Rushed, Sad, Satisfied, Shocked, Sick, Silly, Smart, Stressed, Surprised, Sympathetic, Thankful, Touched, Uncomfortable, and Weird. Not all of these may be considered moods by some people and many moods that people think should be listed are not so listed.

Figure 1:
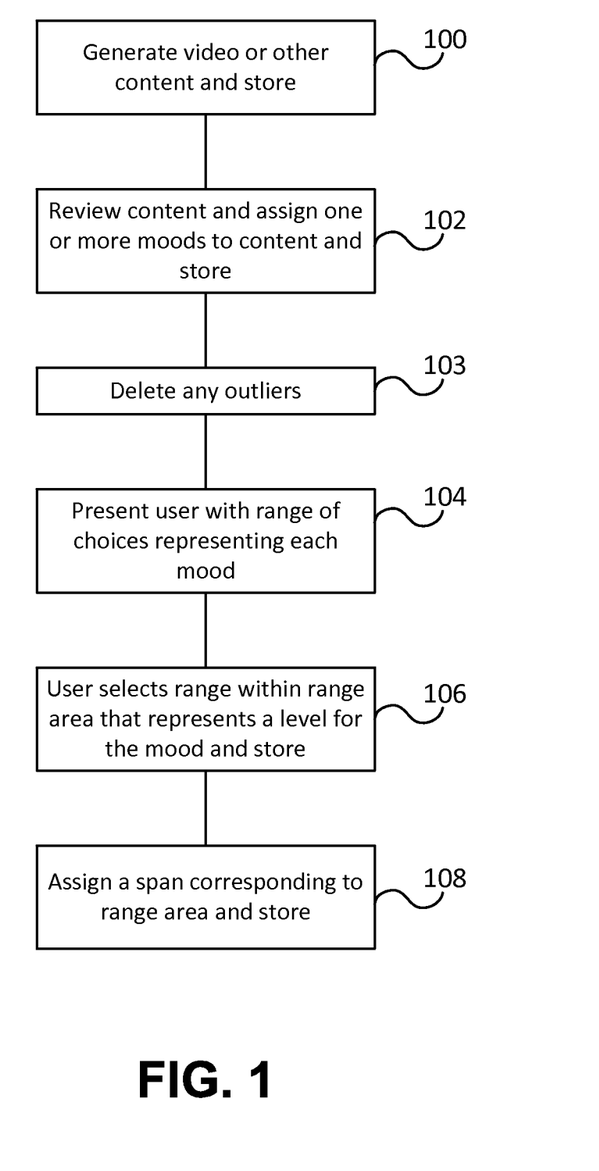
FIG. 1 illustrates a flow diagram of an embodiment for identifying one or more moods corresponding to content and for translating each mood into a span.

FIG. 1 illustrates a flow diagram of an embodiment of a computer system for identifying one or more moods corresponding to a video and translating each mood to a range or span for subsequent processing, search and viewing/listening/selection. Although a video is described in this embodiment, the content may be something other than a video, such as music, pictures, photos, sounds, or any audio element or visual element which serve to elicit an emotion or mood-like response from a viewer or listener. The content or video may be a pre-existing video, such as a movie or other form of similar content, or may be a specially created video that was intended to convey one or more moods.

After being created in step 100 of FIG. 1, the video or content would be stored in non-transitory memory of the computer system and then observed by one or more individuals, or analyzed in some other way, that would result in the assignment of one or more moods to the video, step 102, which would also be stored in the memory. For example, certain individuals may be employed or volunteer to view videos and assign one or more moods to the video based on how the video may make them feel. Alternatively, the video could be made available to one or more individuals in some manner, such as through the graphical user interface of a website, for such an assignment, even though those individuals do not necessarily know they are being tasked with assigning moods to the video. For example, such individuals could be encouraged to visit a website for some purpose not related to assigning moods to video, but nevertheless be encouraged to watch one or more videos and assign moods to that video before they can get something else they want or do something else associated with the website. Alternatively, crowdsourcing could be used to assign moods to video, where anonymous viewers are assigned the task of viewing videos and assigning moods and range areas, as further described below, for free or for some small payment in cash or something else of value that could be transmitted electronically. Since some individuals may not take such a task seriously, outlier moods (moods assigned by a viewer to content that lie far outside of the mean (average) determined by the majority of viewers of that same content) assigned to a video may be deleted from the stored mood assignments for each video, step 103.

The described methods of assigning moods and ranges/spans to videos are just examples and many other methods could be used within the spirit and scope of this disclosure. For example, since some people may view a video and decide that the video makes them feel happy, and other people may view the same video and decide that it makes them feel not happy, i.e., sad or angry, in addition to assigning one or more moods to a video, the opposite of the one or more moods assigned to the same video could also automatically be assigned, or some related mood could be assigned. Hence, any content assigned a happy mood could also automatically be assigned a sad mood as well, or any of a number of related moods. For example, if content was assigned the mood sad, that same content may also be assigned the related moods of dejected, depressed, melancholy, sorrowful, dismal, blue, down, gloomy, glum, forlorn, and low.

Statistical and algorithmic analysis could also be used to assign moods based on a variety of different methods. For example, given a sufficiently large sample of videos that have been assigned moods, certain statistical trends may be found to apply to such videos. Every time viewers assigned mood 1 and mood 2 to a video, 90% of the time they also assigned mood 8 and mood 15 to that same video. If after some period of time, users searching for a video always decided that a particular video meets their mood criteria for mood 1 and/or mood 2, but the video was not also assigned mood 8 and mood 15, the video could further be assigned moods 8 and 15 (through application of an algorithm programmed for such a purpose) because of the high statistical possibility that moods 8 and 15 also apply to the video.

The step of assigning one or more moods 102 to content does not stop at assigning a particular word that corresponds to a particular mood, such as "happy" for content that makes the viewer feel happy. As illustrated in FIG. 1, once a mood has been assigned, the viewer may be presented through the user interface associated with the computer system with a gauge or measuring device that represents an analog spectrum or range of choices representing different degrees of that mood, step 104, as further described below with respect to FIGS. 2 to 5. In step 106, the viewer would then select a point or area (referred to herein as a "range area" even if the range area is represented by a single point within the spectrum or range) within that spectrum or range that represents, to them, a level or degree associated with that mood.

The range may indicate a low to high range, a white to gray to black range, a light to dark color range other that white, gray or black, or some other representation of a spectrum or range, such as 0 to 100, or A to Z, or * to *****, or any other type of representation. If content made a viewer feel happy, but only slightly happy, then that viewer might select an area below a midpoint of the spectrum or range presented. Conversely, if the content made the viewer feel very happy, the viewer might pick an area above the midpoint of the spectrum or range. Since content may make a viewer feel a number of different moods, including not happy, the viewer may select more than one mood and similarly be tasked with assigning a range area on the spectrum or range for each mood assigned to the content.

Figure 2A:
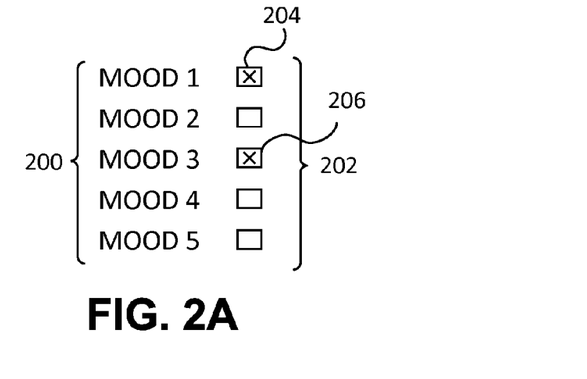
FIG. 2A illustrates an embodiment of a user interface for assigning moods to content.
Figure 2B:
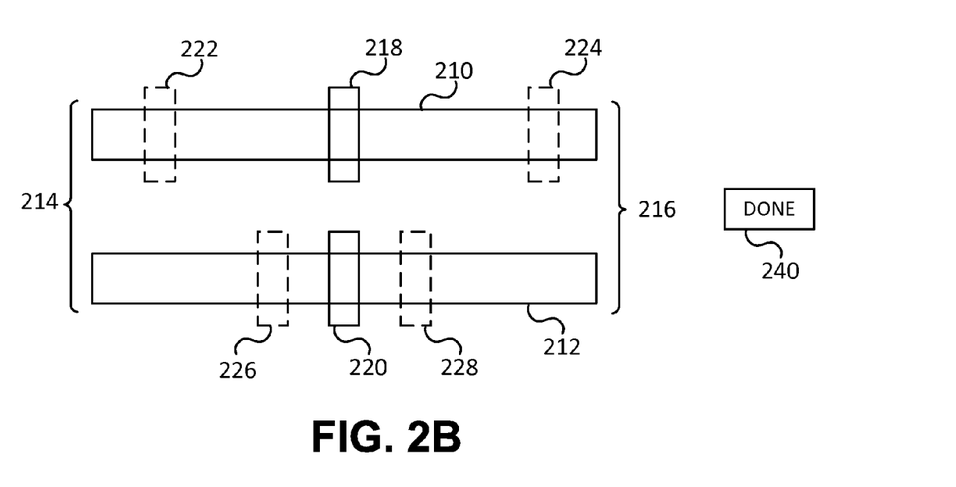
FIG. 2B illustrates an embodiment of a user interface for assigning range areas to moods assigned in FIG. 2A.

For each mood assigned to a video, the viewer would select the range area for that mood, which would be stored in memory, and the computer system would then automatically assign a span corresponding to the range area, step 108, as further illustrated in FIGS. 2A and 2B. The span would also be stored in the memory. While the words "spectrum", "range" and "span" are used somewhat interchangeably herein, the word "span" will primarily be used to represented the selected portion or portions of one or more ranges. The word "span" is also not limited to representing just a portion of a single range, but can quite literally span between two or more ranges. Hence, the word "span" as used herein represents a broader concept that just the words "spectrum" and "range".

FIG. 2A illustrates the first part of an embodiment of a user interface of the computer system for enabling a viewer to select moods and range areas for a video. In order to pre-limit viewer selection and to prevent outliers, a video may be pre-assigned a set of moods that a pre-screener has determined are appropriate for that video. The set of moods could be large or small, depending on how much discretion was desired from the viewers. Alternatively, the video may not be prescreened or otherwise limited and all possible moods could be made available for assignment to the video by the viewer. The moods could be presented in a list or a set of tiles of images or in some other way that allows a view to scan through the moods and select one or more deemed appropriate for the video. While it is recognized that as a result of not pre-limiting; the possible moods that a viewer could assign to a video creates the potential for outliers, it may also enable viewers to assign moods to a video that may not have been among those selected by a pre-screener. Hence, not pre-limiting may allow viewers to more accurately reflect how a video actually makes them feel, while at the same time, not pre-limiting may result in more outliers or unpredictable outcomes, depending on the quality of the viewers at properly assigning moods to video.

As illustrated in FIG. 2A, the video has been pre-screened and assigned a certain number of moods 200, identified as Mood 1, Mood 2, Mood 3, Mood 4 and Mood 5. The number assigned to a mood may vary between one mood and an unlimited number of moods. As shown in FIG. 2A, only a total of five moods have been assigned to a particular video pursuant to the process noted above, but any other number of moods could have been pre-assigned, or no pre-assignment could have been done. The user interface of the computer system could also include some system by which the viewer can then select the moods, such as by selecting a box (such as a radio box that could be selected by a mouse click within the area inside the box), Five radio boxes 202 associated with the five pre-assigned moods are shown in FIG. 2A. If the viewer decided that Mood 1 and Mood 3 best described how the video being viewed made them feel, the viewer would then selected box 204 and 206, associated with Mood 1 and Mood 3 respectively.

As described above, after selecting a mood, the viewer would then be presented through the user interface with a range corresponding to the mood. As illustrated in FIG. 2B, the range 210 corresponds to Mood 1 and range 212 corresponds to Mood 3. Ranges 210 and 212 are simple devices that serve to illustrate an embodiment for identifying a span for the selected areas, but as noted below, many other devices could be used within the spirit of this disclosure. In FIG. 2B, ranges 210 and 212 are simple bars with the low end 214 of the range corresponding to the left end of each bar and the high end 216 of the range corresponding to the right end of each bar. Each range 210 and 212 has a midpoint, such as illustrated the cross bars 218 and 220. To select a range area for Mood 1, the viewer may select the cross bar 218 with the mouse (finger or some other selection device) and drag it to the right or left, or not grab it at all and simply leave it where it was in the middle of the range.

If the viewer selects the cross bar 218 and drags it to the left toward the low end 214 of range 210, the range area would then be represented by the dotted line 222, which might correspond to a "low" range area for the viewer. Conversely, the viewer may selects the cross bar 218 and drags it to the right toward the high end 216 of range 210, the range area would then be represented by the dotted line 224, which might correspond to a "high" range area for the viewer. Likewise, for Mood 3, the viewer could select the cross bar 220 of range 212 and move it to either range area 226 or 228, representing a "medium low" range area or a "medium high" range, respectfully. Once the viewer had made the range area selections, the viewer could indicate that the viewer was done through any of a number of different ways, such as simply selecting the "DONE" button 240.

Figure 2C:
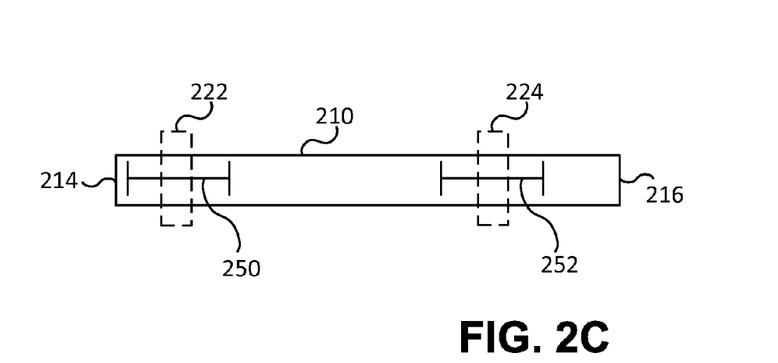
FIG. 2C illustrates an embodiment of a user interface for assigning spans to mood range areas.

Once the viewer was done with range area selection for each range corresponding to each mood, the computer system would then automatically assign a span to each range area, as further illustrated in FIG. 2C. The range 210 is shown in FIG. 2C in greater detail after spans have been assigned to the range areas. For example, span 250 has been assigned to range area 222 and span 252 has been assigned to range area 224. In the case of span 250, the span approximately covers an equal area on either side of the range area 222 and the span goes all of the way to the low end 214. Had the range area 222 been closer to low end 214, the span 250 might not cover an equal area on both sides of the range area 222, but instead cover the same area as shown in FIG. 2C to the right of the range area 222, but cover less area to the left of the range area 222 due to the close proximity of the low end 214. In an embodiment, if the span was limited by the low end or high end of a range, then the span could be more heavily weighted in the opposite direction. As range area 224 is not as close to the high end 216 as range area 222 is close to the low end 214, the high end 216 does not come into play. Nevertheless, there is no reason the span 252 must be equally weighted on either side of the range area 224 and any type of span could be selected. Since each viewer, as noted above, can feel different moods when viewing the same video, the spans are intended to give the mood assignments greater flexibility than they would have if the mood was just identified by a work or a range area or point within a range. Hence, each mode is represented by a span within one or more ranges corresponding to the mood.

While the simple bars 210 and 212 are easy to understand as ways of expressing ranges and spans within a user interface, the present disclosure is not limited to such a simple user interface device. For example, other forms of ranges and spans could be used, such as that illustrated FIG. 3, which shows a rectangular box or area 300 filled with dots 302 creating different areas of dot densities throughout the area 300. Dot density levels are greatest around the edges of the area 300 and lowest inside the middle section of the area 300. While the left side of the area 300 could represent low and the right side of area 300 could represent high, other assignments of low or high could be used, such as the top or bottom of the area 300. Different dot densities could also be used. To select a range area for the mood corresponding to the video being assigned a mood, the viewer may simply pick an area within the area 300, such as range area 304. Range area 304 could be a small dot, a large dot or something else. For example, when the user moved a cursor or similar selection device over the area 300, a small box or other image could be generated over the area 300 corresponding to the location of the cursor over the area 300. Making a selection while over the area 300, would then lock the small box in the selected place, thereby representing the range area 304 selected by the viewer.

Figure 3:
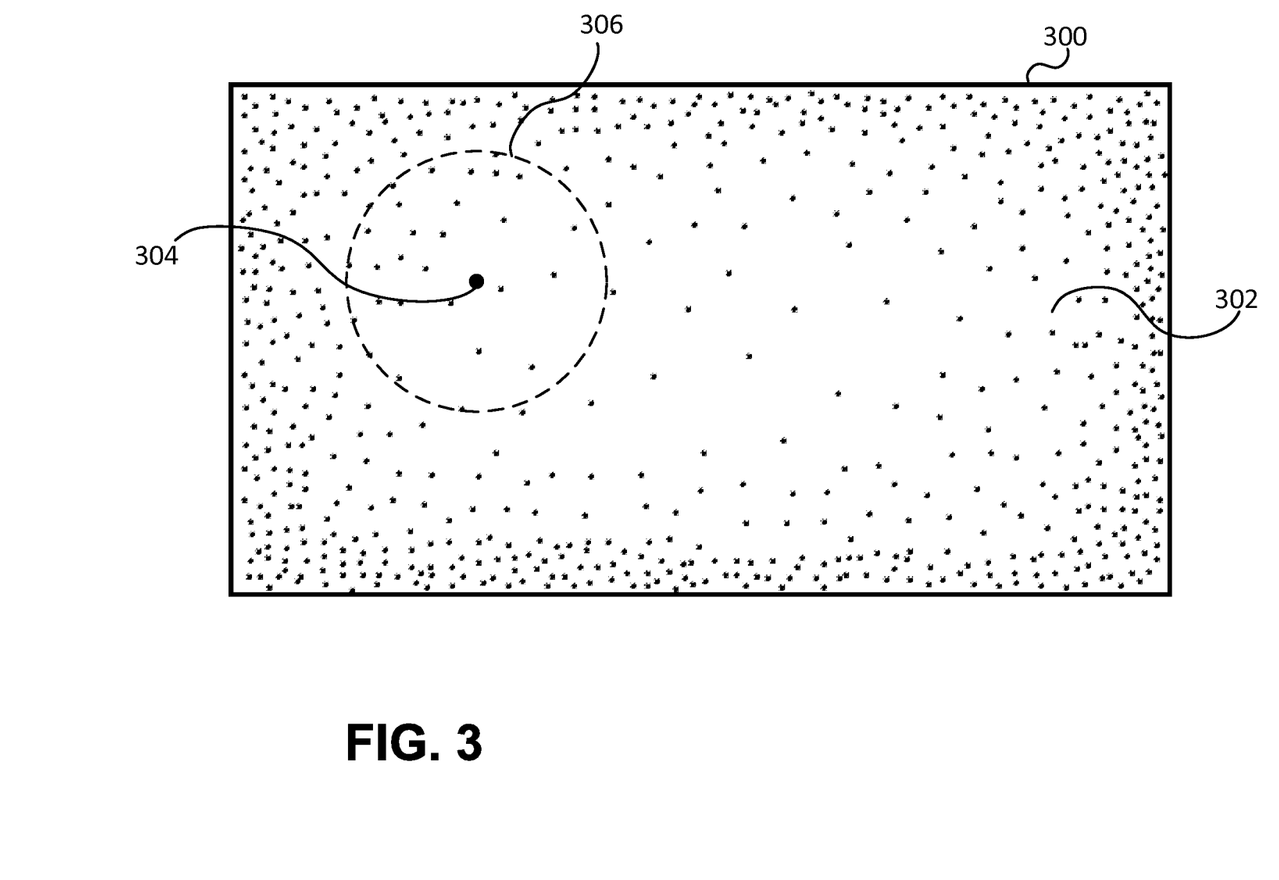
FIG. 3 illustrates an embodiment of a user interface for a mood assignment tool and/or a span selection tool.

The span corresponding to the range area 304 could be determined in a number of different ways, such as a circle 306 centered around the range area 304, but could also be represented by other shapes, such as a square, rectangle, oval, etc. Hence, a range and a span within a range need not be linear (i.e., can be nonlinear) and could be represented by a number of different shapes. Regardless of the manner in which the span is identified and represented, each span represents some identifiable portion of one or more ranges and can be represented as such by a digital set or range of values. Hence, each analog representation of a range can be digitized in some way and the corresponding digital values can be stored in memory for use during searches. For example, the span 306 may be represented by a number assigned to the mood and additional numbers that correspond to the location of the span 306 within the area 300, which may be represented by a matrix of some form, i.e., A-G across the top and 3-7 along the side, which corresponds to A3, B3, C3, D3, E3, F3, G3, A4, B4 . . . G7, or something similar.

For as many range, range area and span representations as there may be for identifying moods for content, there can be a similar number of ways in which to represent ranges, range areas within those ranges and spans corresponding to those range areas. Rather than attempt to list every one of those possible representations, the manner in which users select and search for videos or similar content will now be disclosed, but it is notable that for every selection method possible, the same method of selection could be used for mood range identification. For example, the range 210 could also be used to select a portion of a mood for a range to be searched for in the same manner in which moods were assigned spans in the first place, which will be explain below in further detail.

A user wishing to search for and select a video (to view, send or something else) based on the moods of the video might simply identify a mood that the user wished for the video to convey. That mood could be identified by a word entered by the user in a typical search bar and the search could be performed on that basis. The search engine of the computer system would take the entered word and search the database of moods for videos in the memory of the computer system for videos with similar moods, but this would not be much different from searching for key words in other ways, and may not correctly identify the right videos corresponding to the identified moods of the search. In an embodiment, the user could be presented (such as through a user interface) with a list of moods the user was interested in seeing represented by videos in the database, and then likewise presented with a search range corresponding to each selected mood. The user would then select a search span within the search range or ranges in a manner similar to that described above. Range areas could also be used in a similar manner to identity search spans, but it may also be possible to skip the use of range areas for searching and to just have the user select the span directly from within each range. For example, a user presented with range 210, could simply select the entire range 210 to search, or could select the lower half of the range 210 to search. As will be illustrated below, the utilization of spans allows users to select portions of two or more ranges at a time, significantly expanding the scope and complexity of a search.

Figure 4A:
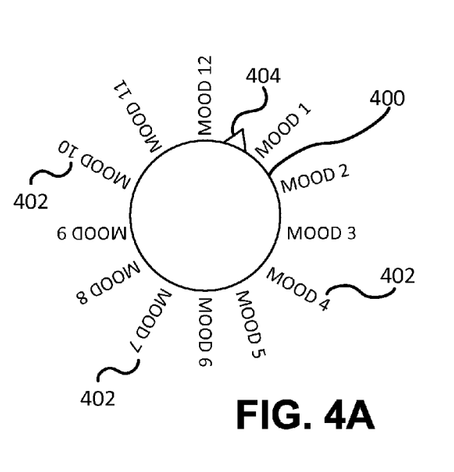
FIGS. 4A-4E illustrate embodiments of user interfaces for mood assignment tools and/or a span selection tools.

FIGS. 4A-4E illustrate other embodiments of user interfaces enabling users to select range areas and/or spans within ranges for both mood assignment and mood searching, although just mood searching will be described herein. In FIG. 4A, the user is presented with dial 400, which is shaped like a circle with numerous words 402 corresponding to moods extending from the circle likes the rays from the sun. Within the circle 400 is a color wheel or colored area with different colors or different shades, hues, intensities or other variances of a color that correspond to each mood 402, with each color or variance bleeding into the next in the same manner as the colors of the rainbow appear to bleed from one color to the next as the light spectrum changes. A dial 404 could then be user selectable so that a user could select the dial 404 and move it around the circle 400. If a user moved the dial 404 so that the dial was aligned with a particular mood 402, and made that the user's search selection, the span would then be selected as a corresponding portion of the color wheel, which would then be digitized in some manner.

A variety of different techniques are known in the art for digitizing images, colors, ranges and the like and need not be disclosed here for a full understanding of this disclosure. Typically, the same digitization process or format used to digitize assignment spans would be used for searches, but since it is possible that content could be digitized using one format and searches could be performed using a different format, some conversion between the different formats may be required, as is well understood in the art.

It should also be noted that moods and corresponding spans assigned to videos in one manner may be searched by a user based on the same type of span or completely different types of spans, but there needs to be some overlap in the digital content between the assigned span and the search span for video to be identified as a result of a search. This concept can be more simply explained with reference back to the range of FIG. 2C. If the range 210 corresponded to the numbers 1-100 and span 252 corresponded to numbers 65-85 of that range for a mood of a video, and a user performing a search using the same type of range selected the right half of the range 210 to search, then the video identified by the mood range 65-85 would be produced as a result of the search. If, however, the user performing the search had identified the left half of the range 210, then the video identified by the mood range 65-85 would not be produced as a result of the search, even though that video at least corresponds to the same mood for which the user is searching. As with other types of search engines, a goal of the present embodiments is not to identify every possible video that might correspond to the search request in some way, but to identify the best results. Since the video in question was assigned a high end of a mood and the user was interested in the low end of that mood, the video was not the best result, even though the assigned mood(s) matched the searched mood(s).

Figure 4B:
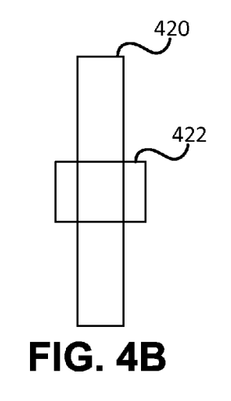
Figure 4C:
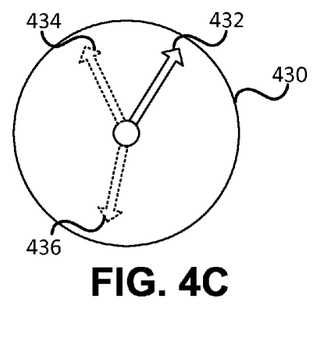
Figure 4D:
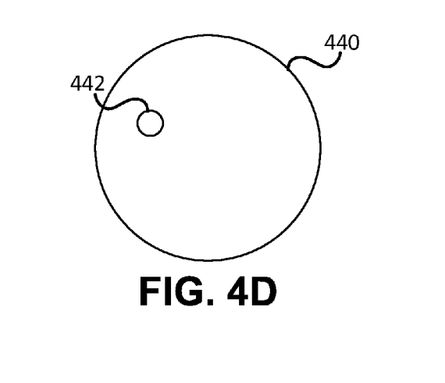

Other ways of representing ranges, range areas and spans that can be used for mood assignment and mood search are illustrated in FIGS. 4B to 4E. In FIG. 4B, a range 420 similar to that of ranges 210 and 212 is illustrated, with the range being vertical rather than horizontal. Range 420 has a similar range area selector and span(s) assigned in a manner similar to that of ranges 210 and 212. Alternatively, as illustrated in FIG. 4B, for search purposes, there may be no range selection and only a span selection tool, such as tool 422, which allows the user to move the span selection tool up and down the range 420 to identify different spans within the range. In an embodiment, as shown in FIG. 4C, the wheel 430 and dial 432 could be used to represent ranges by moving the dial 432 to a first position 434 to mark the first part of a span and then moving the dial 432 to a second position 436 to mark the second part of a span, with the digitized range of the span being identified as some range of numbers or other identifiers between mark 434 and mark 436. Similarly, in FIG. 4D, a color wheel 440 could be used with a movable large circle 442 within the color wheel 440 being the span selection tool. A honeycomb pattern 450 illustrated in FIG. 4E could be used in a manner similar to the color wheel 440, but with the variances between honeycomb cells 452 being used to denote a finer or more varied subset of digitized ranges as well as cross overs between moods, as further described below.

Figure 4E:
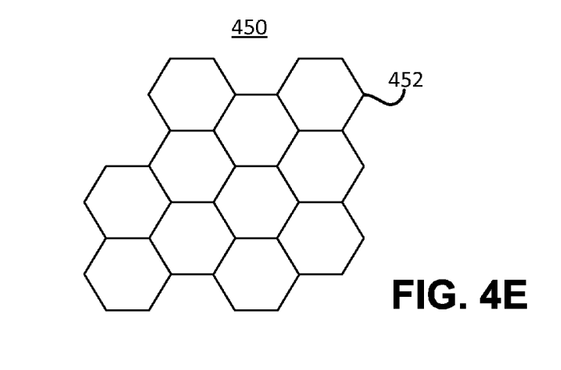

As noted in reference to FIG. 2C, it is possible, under some circumstances for a span to only partly cover a range for a mood. It is also possible for moods to overlap ranges. For example, when colors or other gradations, such as the edges of the honeycomb cells 452 are used to represent moods, related moods may be placed next to one another on the color wheel, or honeycomb cell pattern, or in some other manner, such that a span crosses over from one mood to another mood, i.e., a little bit "happy" and a little bit "agitated", or some other combination. In the same manner, when a user is searching for content and selects a span that crosses over two or more ranges, then two or more moods may be identified, resulting a number of different corresponding content pieces, i.e., videos or whatever, being identified as results for the search.

Figure 5:
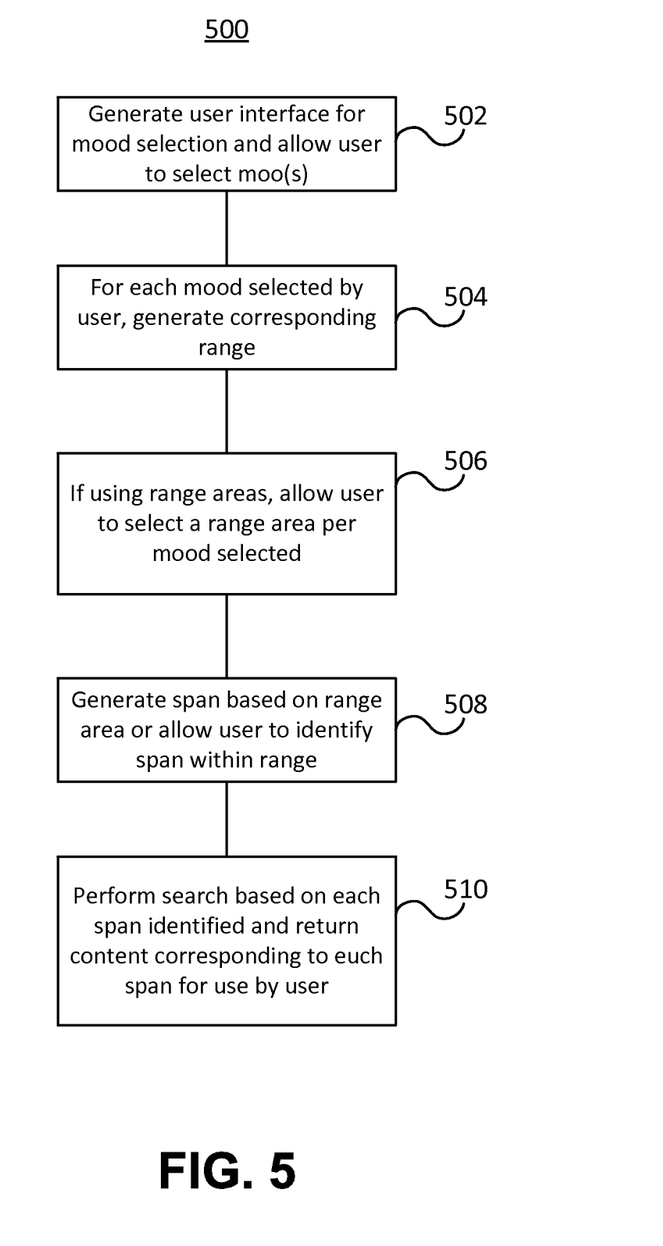
FIG. 5 is a flow diagram of an embodiment for selecting moods, range areas and/or spans for a search and performing a search.

FIG. 5 further illustrates this last concept in the form of a flow diagram 500, as well as the process for allowing a user to select moods, identify spans and perform searches for content. In step 502, a user interface is generated by the computer system that presents the user with a selection of moods and allows the user to select one or more moods to which content may relate. For each mood selected by the user, in step 504, the user interface will then generate a corresponding range from which the user, in step 506, can select a range area, if range areas are being used, in which case a corresponding span will automatically be created, or select a span and bypass selecting a range area, step 508.

Returning to the example of more complicated span selection tools such as tools 400, 440 and 450, a user may select a range of colors or gradations of a single color, or a number of cells within the honeycomb or some similar tool, or even partial cells, i.e., a user may be able to draw a shape around a number of cells or colors or gradations within the interface display of a tool and have a search performed for any content that falls within all or part of the area bounded by the shape, in a manner similar to how the span 306 of area 300 covers range of different dot densities. All of the range or ranges identified by the span or spans would then be converted into corresponding digital value ranges as discussed above and the search would be performed by attempting to match digital value ranges from the assignments with digital value ranges from the search criteria. If a video's assigned digital value ranges fell completely within a search digital value range, there would be a 100% correlation between the content and the search, leaving that video to be highly ranked as a result of the search. If a video's assigned digital value ranges only fell partly within a search digital value range, then the video would only have a partial percentage correlation, such as 20%, 40% or 75%, and would then be ranked accordingly in the results. The user instituting the search may then be returned a listing of videos (or other content) based on the rankings generated from the percentage correlations between assigned digital value ranges and search digital value ranges, as in step 510 of FIG. 5.

As can be appreciated from the above description, even slight changes in a user search span selection within a span selection tool can result in significant changes in the searched digital value ranges and therefore result in different results. In the same manner, starting with a slightly different mood may also result in fairly significant search results, which can be advantageous depending on the application of the mood assignment and search system.

Figure 6:
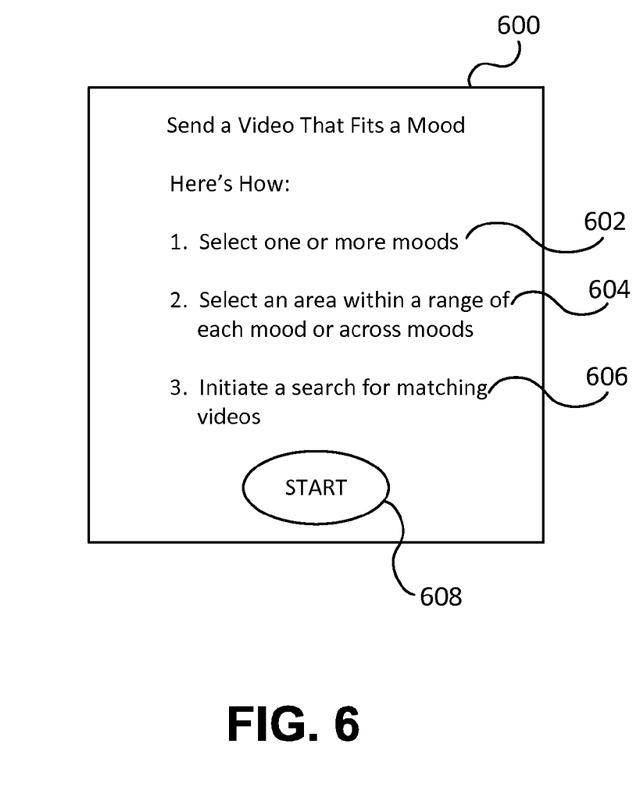
FIG. 6 illustrates an embodiment of search user interface for a user.

One possible application for this computer-implemented mood assignment and search system, the "system", is a system for a form of electronic greetings that uses short videos in place of animated greeting cards or other electronic greeting cards. In accordance with an embodiment, as illustrated in FIG. 6, a user may access a website, or similar type of user interface tool 600, connected to a network or computer system, and initiate a search for videos. The initial screen 600 illustrated in FIG. 6 may provide instructions for how to use the system, or simply take users directly into the search function; how users get to the search function is not important to the current embodiment. As shown in FIG. 6, the interface tool 600 invites the user to "Send a Video that Fits a Mood—Here's How:" and proceeds to explain the steps explained above to the user in terms of selecting one or more moods, 602, selecting ranges, 604, and initiating a search, 606. Selecting the START button 608 would take the user to another screen that includes the moods from which the user can select, which then starts the range area selection and/or span selection processes described above.

Once a user has searched for and identified a video the user wants to send, the user could enter an email address for the recipient, possibly include a personal greeting of some form and cause the video to be sent to the user. Due to file size and bandwidth limitations, and a desire by the operator of the system to control the content, the video itself would likely not be sent to the recipient, but rather a link to the video or some other device that enabled the recipient to be streamed the video without the ability to download or more permanently store the video. Rather than sending videos as greeting cards, other embodiments are possible, such as searching for content to view or listen to, performing research, or many other purposes. And, again, while visual and aural content are primarily described herein the content assignment and search techniques described herein could be used for any type of content.

Figure 7:
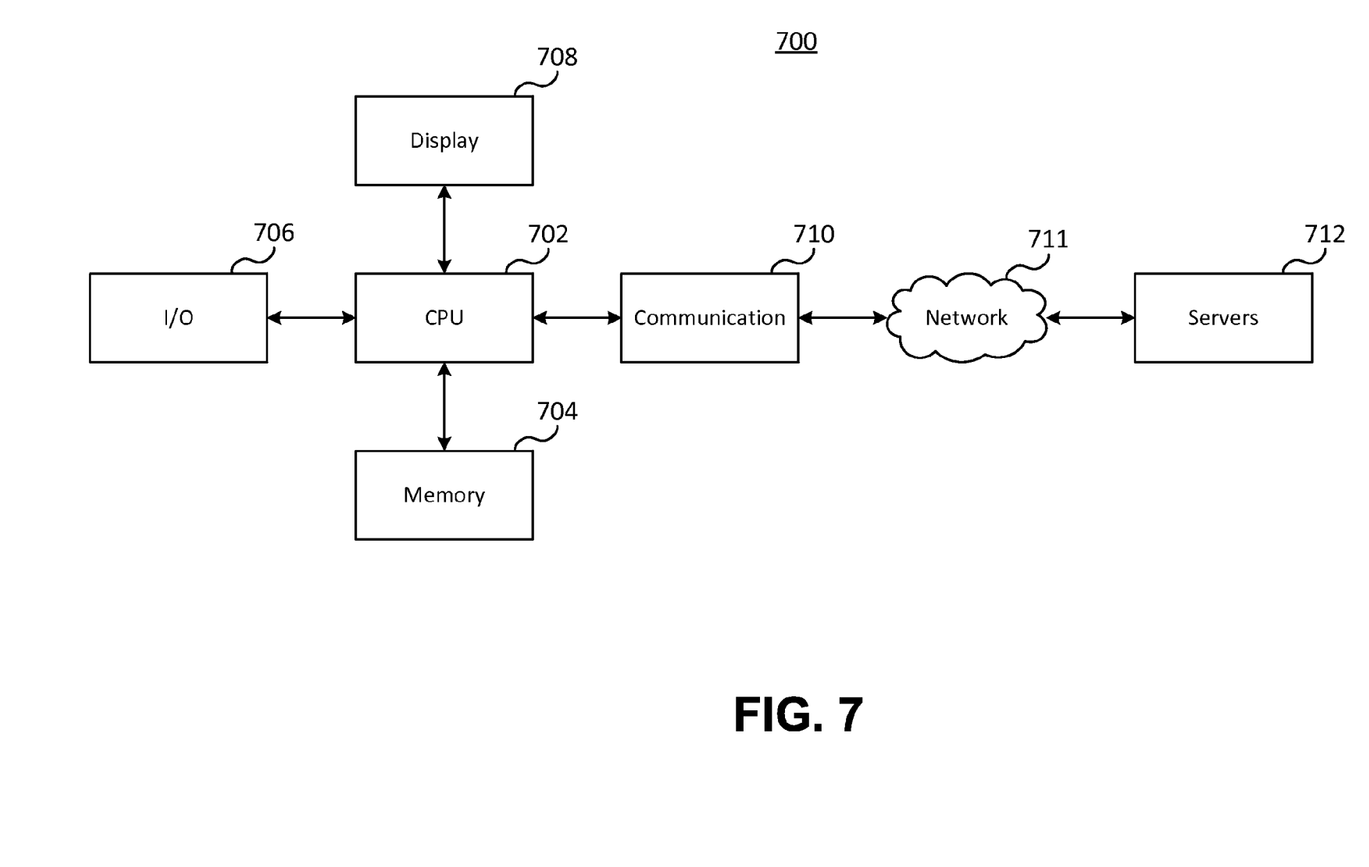
FIG. 7 illustrates an embodiment of an assignment and search system.

FIG. 7 illustrates an embodiment of a computer-implemented mood assignment and search system 700 as described herein. The system 700 includes at least central processing unit or processor 702 and non-transitory memory 704 connected to the processor 702. Also connected to the processor 702 is one or more input/output devices 706, such as a mouse, printer, scanner, point tool, user-interactive screen, etc., a display 708, such as for providing the user interfaces described above, and a communication controller and link 710. The link 710 may be connected to a network 711, such as the Internet, which is in turn connected to one or more servers 712 for storing and delivering video content and the like. As disclosed herein, the system 700 could operate independent of the network 711 and servers 712 or operate in conjunction with them, such as in a client/server type of arrangement.

Some embodiments of the present disclosure will now be presented, but these embodiments are by no means limiting to the embodiments by which the present disclosure could be implemented. In an embodiment, a computer-implemented method for identifying content stored within a non-transitory memory, comprising, utilizing a processor of a computer to access the content for review by a user, presenting through a user interface of the computer one or more mood identifiers for selection by the user, each of the mood identifiers corresponding to a mood among one or more moods to be assigned to the content by the user, for each mood identifier selected by the user, presenting through the user interface one or more ranges corresponding to at least a degree of the mood to be assigned to the content, for each range presented to the user, presenting through the user interface a selectable range area within each range for placement by the user, utilizing the processor to mark a placement of the selectable range area within each range by the user, utilizing the processor to generate a span corresponding to at least a portion of each range that includes at least the selectable range area marked by the placement, and utilizing the processor to digitize the span and store the digitized span in the non-transitory memory, each digitized span identifying the content by the portion of each range which corresponds to a degree of the mood assigned to the content by the user.

In the embodiment recited, wherein the one or more mood identifiers includes a common name for each of the one or more moods. In the embodiment recited, wherein the content is assigned moods by a plurality of users resulting in an average of user assigned moods for the content, further comprising utilizing the processor to determine if any of the assigned moods are outliers to the average and deleting any of the assigned moods that are outliers. In the embodiment recited, wherein the content is video. In the embodiment recited, wherein the content is audio. In the embodiment recited, wherein each range is formed by a range bar and the selectable range area is a subset of the range bar, and wherein the portion is on either side of the range area. In the embodiment recited, wherein each range is formed by a range bar and the selectable range area is a subset of the range bar, and wherein the portion is partly within a first range and partly within one or more additional ranges corresponding to one or more moods assigned to the content by the user. In the embodiment recited, wherein each range is formed by a geometric shape filled with a color and the selectable range area is a subset of the geometric shape, and wherein the color varies based on one or more of colorfulness, chroma, purity, hue, saturation, value dichromatism, shade, tint and gloss. In the embodiment recited, wherein each range is formed by a geometric shape filled with two or more colors and the selectable range area is a subset of the geometric shape. In the embodiment recited, wherein the one or more ranges include a plurality of ranges placed near one another through the user interface, wherein each range among the plurality of ranges are geometric shapes, and wherein the placement of the selectable range includes at least two ranges among the plurality of ranges.

In the embodiment recited, further comprising, utilizing the processor to access the content from the non-transitory memory for selection by a content searcher, presenting through the user interface a plurality of search mood identifiers for selection by the content searcher, each of the search mood identifiers corresponding to one of the moods previously assigned to the content by the user, for each search mood identifier selected by the content searcher, presenting through the user interface one or more search ranges corresponding to at least a degree of mood to be searched for by the content searcher, for each search range presented to the content searcher, presenting through the user interface a search span for selection by the content searcher, utilizing the processor to digitize the search span and to search the non-transitory memory to identify all content that includes at least a portion of the digitized search span, and presenting through the user interface at least some portion of the identified content to the content searcher.

In the embodiment recited, wherein the identified content is ranked based on a percentage of the portion of the digitized search span that corresponds to the content. In the embodiment recited, wherein each search range is formed by a search range bar. In the embodiment recited, wherein each search range is formed by a geometric shape filled with a color and wherein the color varies based on one or more of colorfulness, chroma, purity, hue, saturation, value dichromatism, shade, tint and gloss. In the embodiment recited, wherein each search range is formed by a geometric shape filled with two or more colors. In the embodiment recited, wherein the one or more search ranges include a plurality of search ranges placed near one another through the user interface, wherein each search range among the plurality of search ranges are geometric shapes, and wherein the search span includes at least two search ranges among the plurality of search ranges.

In the embodiment recited, further comprising, utilizing the processor to access the content from the non-transitory memory for selection by a content searcher, presenting through the user interface a plurality of search mood identifiers for selection by the content searcher, each of the search mood identifiers corresponding to one of the moods previously assigned to the content by the user, utilizing the processor to search the non-transitory memory to identify all content that corresponds to one or more of the search mood identifiers selected by the content searcher, and presenting through the user interface at least some portion of the identified content to the content searcher.

In the embodiment recited, wherein the identified content is ranked based on a number of search mood identifiers that corresponds to the identified content. In the embodiment recited, wherein the content is video content and further comprising enabling through the user interface the content searcher to select at least one video from the identified content to make accessible to a second party as a greeting from the content searcher. In the embodiment recited, wherein the at least one video is made accessible by a hyperlink included in an email message sent to the second party. In the embodiment recited, wherein the at least one video is made accessible by including a copy of the at least one video in an email message sent to the second party.

In another embodiment, a computer-implemented method for searching a plurality of content stored within a non-transitory memory, comprising, utilizing a processor of a computer to access the plurality of content for selection by a content searcher, presenting through the user interface a plurality of mood identifiers for selection by the content searcher, each of the mood identifiers corresponding to a mood among a plurality of moods, each content among the plurality of content having been previously assigned at least one mood among the plurality of moods by one or more users other than the content searcher, utilizing the processor to search the plurality of content to identify all content that corresponds to one or more of the mood identifiers selected by the content searcher, and presenting through the user interface at least some portion of the identified content to the content searcher.

In the embodiment recited, further comprising, for each mood identifier selected by the content searcher, presenting through the user interface one or more ranges corresponding to a degree of the at least one mood, for each range presented to the content searcher, presenting through the user interface a span for selection by the content searcher, utilizing the processor to digitize the span, the span corresponding to the one or more mood identifiers selected by the content searcher.

In the embodiment recited, wherein the identified content is ranked based on a percentage of the portion of the digitized span that corresponds to the one or more mood identifiers selected by the content searcher. In the embodiment recited, wherein each range is formed by a range bar. In the embodiment recited, wherein each range is formed by a geometric shape filled with a color and wherein the color varies based on one or more of colorfulness, chroma, purity, hue, saturation, value dichromatism, shade, tint and gloss. In the embodiment recited, wherein each range is formed by a geometric shape filled with two or more colors. In the embodiment recited, wherein the one or more ranges include a plurality of ranges placed near one another through the user interface, wherein each range among the plurality of ranges are geometric shapes, and wherein the span includes at least two ranges among the plurality of ranges. In the embodiment recited, wherein the identified content is ranked based on a number of mood identifiers that corresponds to the identified content. In the embodiment recited, wherein the content is video content and further comprising enabling through the user interface the content searcher to select at least one video from the identified content to make accessible to a second party as a greeting from the content searcher. In the embodiment recited, wherein the at least one video is made accessible by a hyperlink included in an email message sent to the second party. In the embodiment recited, wherein the at least one video is made accessible by including a copy of the at least one video in an email message sent to the second party.

In each of the embodiments, a first computer may include the non-transitory memory and a second computer the processor and the user interface, which may be graphical or aural or both. The non-transitory memory, the processor and the user interface may also be part of one computer that is then accessed by a user over a network from other computers, such as over the World Wide Web of the Internet or some other network, through a client-server arrangement, or some other arrangement by which it is not necessary for the user to have the content stored on the user's computer for the user to have access to the content, to assign moods to the content, or to search the content based on moods.

A number of computing systems have been described throughout this disclosure. The descriptions of these systems are not intended to limit the teachings or applicability of this disclosure. Further, the processing of the various components of the illustrated systems may be distributed across multiple machines, networks, and other computing resources. For example, each module of the secure file distribution system may be implemented as separate devices or on separate computing systems, or alternatively as one device or one computing system. In addition, two or more components of a system may be combined into fewer components. Further, various components of the illustrated systems may be implemented in one or more virtual machines, rather than in dedicated computer hardware systems. Likewise, the data repositories shown may represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown may communicate with any other subset of components in various implementations.

Depending on the embodiment, certain acts, events, or functions of any of the algorithms described herein may be performed in a different sequence, may be added, merged, or left out altogether (e.g., not all described acts or events are necessary for the practice of the algorithms). Moreover, in certain embodiments, acts or events may, be performed concurrently, e.g., through multi-threaded processing, interrupt processing, or multiple processors or processor cores or on other parallel architectures, rather than sequentially.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each service described, such as those shown in FIG. 2, may be implemented by one or more computing devices, such as one or more physical servers programmed with associated server code.

Conditional language used herein, such as, among others, "may," "might," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated may be made without departing from the spirit of the disclosure. As will be recognized, the processes described herein may be embodied within a form that does not provide all of the features and benefits set forth herein, as some features may be used or practiced separately from others. The scope of protection is defined by the appended claims rather than by the foregoing description. All changes which come within the meaning and range of equivalency of the claims are to be embraced within their scope.

What is claimed:

1. A computer-implemented method for identifying content stored within a non-transitory memory, comprising:
   utilizing a processor of a computer to access the content for review by a user;
   presenting through a user interface of the computer one or more mood identifiers for selection by the user, each of the mood identifiers corresponding to a mood among one or more moods to be assigned to the content by the user;
   for each mood identifier selected by the user, presenting through the user interface one or more graphically depicted ranges, wherein each graphically depicted range represents a set of degrees of the mood to be assigned to the content;
   for each graphically depicted range presented to the user, presenting through the user interface a selectable range area within each graphically depicted range for placement by the user;
   utilizing the processor to mark a placement of the selectable range area by the user within each graphically depicted range, wherein the selectable range area corresponds to a first subset of the set of degrees of the mood;
   utilizing the processor to automatically generate a sub-range span corresponding to a second subset of the set of degrees of the mood within each graphically depicted range, wherein the second subset includes all of the first subset and is larger than the first subset; and
   utilizing the processor to digitize each sub-range span and store each of the digitized spans in the non-transitory memory, each digitized span identifying degrees of the mood assigned to content by the user.

2. The computer-implemented method recited in claim 1, wherein the one or more mood identifiers includes a common name for each of the one or more moods.

3. The computer-implemented method recited in claim 1, wherein the content is assigned moods by a plurality of users resulting in an average of user assigned moods for the content, further comprising utilizing the processor to determine if any of the assigned moods are outliers to the average and deleting any of the assigned moods that are outliers.

4. The computer-implemented method recited in claim 1, wherein the content is video.

5. The computer-implemented method recited in claim 1, wherein the content is audio.

6. The computer-implemented method recited in claim 1, wherein each graphically depicted range is formed by a range bar-shaped user interface element and the first subset includes a first portion of the range bar-shaped user interface element, and wherein the second subset includes a second portion and a third portion of the range bar-shaped user interface element on either side of the first portion.

7. The computer-implemented method recited in claim 1, wherein each graphically depicted range is formed by a first range bar-shaped user interface element and the first subset includes a first portion of the first range bar-shaped user interface element, and wherein the second subset includes a second portion of the first range bar-shaped user interface element and a third portion of a second bar-shaped user interface element corresponding to an additional graphically depicted range corresponding to one or more moods assigned to the content by the user.

8. The computer-implemented method recited in claim 1, wherein each graphically depicted range is formed by a geometric shape filled user interface element with a color and the first subset is a portion of the geometric shape, wherein the color varies based on one or more of colorfulness, chroma, purity, hue, saturation, value dichromatism, shade, tint, and gloss, and wherein the graphically depicted portion is represented by the color variance.

9. The computer-implemented method recited in claim 1, wherein each graphically depicted range is formed by a geometric shape filled user interface element with two or more colors and the first subset is a portion of the geometric shape.

10. The computer-implemented method recited in claim 1, wherein the one or more graphically depicted ranges include a plurality of graphically depicted ranges placed near one another through the user interface, wherein each graphically depicted range among the plurality of graphically depicted ranges are geometric shapes, and wherein the placement of the selectable range area includes at least two graphically depicted ranges among the plurality of graphically depicted ranges.

11. The computer-implemented method recited in claim 1, further comprising:
utilizing the processor to access the content from the non-transitory memory for selection by a content searcher;
presenting through the user interface a plurality of search mood identifiers for selection by the content searcher, each of the search mood identifiers corresponding to one of the moods previously assigned to the content by the user;
for each search mood identifier selected by the content searcher, presenting through the user interface one or more graphically depicted search ranges, wherein each graphically depicted search range represents a search set of degrees of the mood to be searched for by the content searcher;
for each graphically depicted search range presented to the content searcher, presenting through the user interface a search span for selection by the content searcher, wherein the search span corresponds to a search subset of the search set of degrees of the mood within each graphically depicted search range;
utilizing the processor to digitize the search span and to search the non-transitory memory to identify all content that includes at least a portion of the digitized search span; and
presenting through the user interface at least some portion of the identified content to the content searcher.

12. The computer-implemented method recited in claim 11, wherein the identified content is ranked based on a percentage of the portion of the digitized search span that corresponds to the content.

13. The computer-implemented method recited in claim 11, wherein each graphically depicted search range is formed by a search range bar-shaped user interface element.

14. The computer-implemented method recited in claim 11, wherein each graphically depicted search range is formed by a geometric shape user interface element filled with a color and wherein the color varies based on one or more of colorfulness, chroma, purity, hue, saturation, value dichromatism, shade, tint, and gloss, and wherein the search span is represented by the color variance.

15. The computer-implemented method recited in claim 11, wherein each graphically depicted search range is formed by a geometric shape filled with two or more colors.

16. The computer-implemented method recited in claim 11, wherein the one or more graphically depicted search ranges include a plurality of graphically depicted search ranges placed near one another through the user interface, wherein each graphically depicted search range among the plurality of graphically depicted search ranges are geometric shapes, and wherein the search span includes at least two graphically depicted search ranges among the plurality of graphically depicted search ranges.

17. The computer-implemented method recited in claim 1, further comprising:
utilizing the processor to access the content from the non-transitory memory for selection by a content searcher;
presenting through the user interface a plurality of search mood identifiers for selection by the content searcher, each of the search mood identifiers corresponding to one of the moods previously assigned to the content by the user;
utilizing the processor to search the non-transitory memory to identify all content that corresponds to one or more of the search mood identifiers selected by the content searcher; and
presenting through the user interface at least some portion of the identified content to the content searcher.

18. The computer-implemented method recited in claim 17, wherein the identified content is ranked based on a number of search mood identifiers that corresponds to the identified content.

19. The computer-implemented method recited in claim 17, wherein the content is video content and further comprising enabling through the user interface the content searcher to select at least one video from the identified content to make accessible to a second party as a greeting from the content searcher.

20. The computer-implemented method recited in claim 19, wherein the at least one video is made accessible by a hyperlink included in an email message sent to the second party.

21. The computer-implemented method recited in claim 19, wherein the at least one video is made accessible by including a copy of the at least one video in an email message sent to the second party.

22. A computer-implemented method for searching a plurality of content stored within a non-transitory memory, comprising:
utilizing a processor of a computer to access the plurality of content for selection by a content searcher;
presenting through the user interface a plurality of mood identifiers for selection by the content searcher, each of the mood identifiers corresponding to a mood among a plurality of moods, each content among the plurality of content having been previously assigned at least one mood among the plurality of moods by at least one user other than the content searcher, wherein the assignment of at least one mood by at least one user including the marking by the at least one user of a placement of a selectable range area of a graphically depicted range depicting a set of degrees of the mood, the selectable range area corresponding to a first subset of the set of degrees of the mood, and the automatic generation by a processor of a computer of a sub-range span corresponding to a second subset of the set of degrees of the mood within each graphically depicted range, wherein the second subset includes all of the first subset and is larger than the first subset;

for each mood identifier selected by the content searcher, presenting through the user interface one or more graphically depicted ranges corresponding to degrees of the at least one mood;

for each graphically depicted range presented to the content searcher, presenting through the user interface a sub-range span for selection by the content searcher, wherein the sub-range span corresponds to a graphically depicted portion of the graphically depicted range presented to the content search;

utilizing the processor to digitize each selected sub-range span;

utilizing the processor to search the plurality of content utilizing the digitized span to identify all content that corresponds to one or more of the mood identifiers selected by the content searcher; and presenting through the user interface at least some portion of the identified content to the content searcher.

23. The computer-implemented method recited in claim 22, wherein the identified content is ranked based on a percentage of the portion of the digitized span that corresponds to the one or more mood identifiers selected by the content searcher.

24. The computer-implemented method recited in claim 22, wherein each graphically depicted range is formed by a range bar-shaped user interface element.

25. The computer-implemented method recited in claim 22, wherein each graphically depicted range is formed by a geometric shape filled user interface element with a color, wherein the color varies based on one or more of colorfulness, chroma, purity, hue, saturation, value dichromatism, shade, tint, and gloss, and wherein the graphically depicted portion is represented by the color variance.

26. The computer-implemented method recited in claim 22, wherein each graphically depicted range is formed by a geometric shape filled user interface element with two or more colors.

27. The computer-implemented method recited in claim 22, wherein the one or more graphically depicted ranges include a plurality of graphically depicted ranges placed near one another through the user interface, wherein each graphically depicted range among the plurality of graphically depicted ranges are geometric shapes, and wherein the sub-range span includes at least two graphically depicted ranges among the plurality of graphically depicted ranges.

28. The computer-implemented method recited in claim 22, wherein the identified content is ranked based on a number of mood identifiers that corresponds to the identified content.

29. The computer-implemented method recited in claim 22, wherein the content is music content and further comprising enabling through the user interface the content searcher to select at least one music from the identified content to make accessible to a second party as a greeting from the content searcher.

30. The computer-implemented method recited in claim 29, wherein the at least one music is made accessible by a hyperlink included in an email message sent to the second party.

31. The computer-implemented method recited in claim 29, wherein the at least one music is made accessible by including a copy of the at least one music in an email message sent to the second party.

* * * * *